(No Model.) 2 Sheets—Sheet 1.

G. CROMPTON & H. WYMAN.
MECHANICAL MOVEMENT.

No. 281,842. Patented July 24, 1883.

Witnesses.
Fred A. Powell
John F. C. Prenkert

Inventor.
George Crompton and
Horace Wyman
by Crosby & Gregory attys

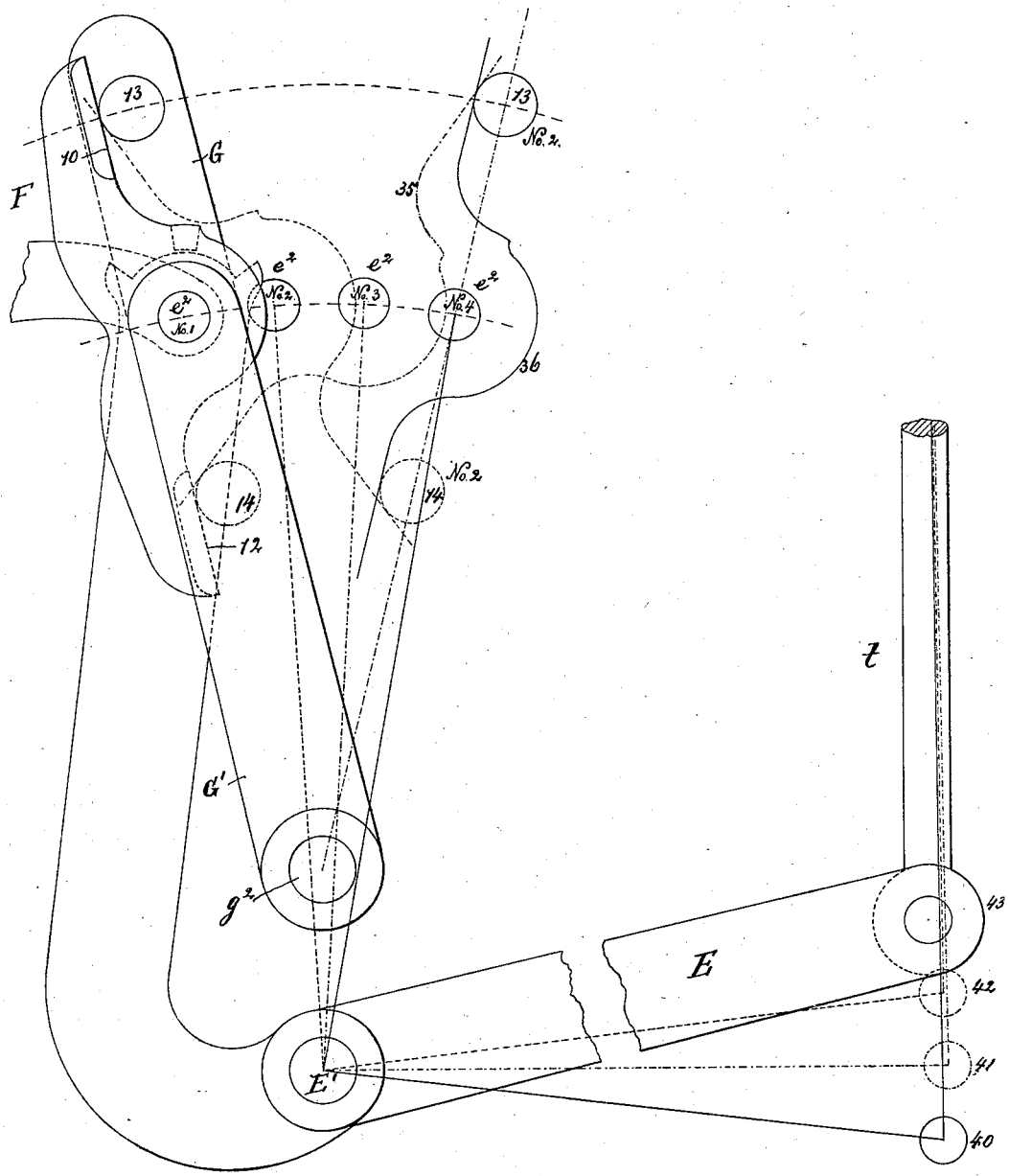

United States Patent Office.

GEORGE CROMPTON AND HORACE WYMAN, OF WORCESTER, MASSACHUSETTS, ASSIGNORS TO SAID CROMPTON.

MECHANICAL MOVEMENT.

SPECIFICATION forming part of Letters Patent No. 281,842, dated July 24, 1883.

Application filed April 30, 1883. (No model.)

*To all whom it may concern:*

Be it known that we, GEORGE CROMPTON and HORACE WYMAN, of Worcester, county of Worcester, State of Massachusetts, have invented an Improvement in Mechanical Movements, of which the following description, in connection with the accompanying drawings, is a specification, like letters on the drawings representing like parts.

The object of this invention is to impart to a lever a reciprocating movement for different distances from a rotating shaft by the intervention of gearing, toothed cranks, and other levers, as will be described.

In the invention herein contained, the main lever, to be moved about its fulcrum for a greater or less distance, carries at or near its end a short secondary lever, which is pivoted upon the main lever, and has two faces, against which bear and move two pins or studs mounted upon movable carriers, (herein shown as radius-bars of different lengths,) in order that the said pins or studs may bear against the faces of the secondary lever at opposite sides of its pivotal center. These pins and their carriers derive movement from connecting-rods attached to crank-pins of toothed cranks having their fulcra on vibrators under the control of a pattern-surface, so that as the vibrators are raised or lowered one or the other of the two intermittingly-operated partial gears will be made the driver for the toothed cranks, to turn them in one or the other direction for preferably a little more than one hundred and eighty degrees, in order that each crank-pin, when left at rest, may occupy a position beyond a line drawn from the center of the toothed crank by the pin or stud of the carrier with which the connecting-rod is joined. We have also shown means for locking the vibrators in position while the toothed cranks are being rotated by the partial gear.

Figure 2:
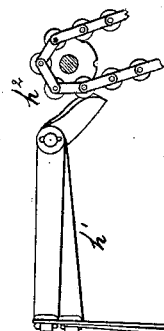
Figure 2:
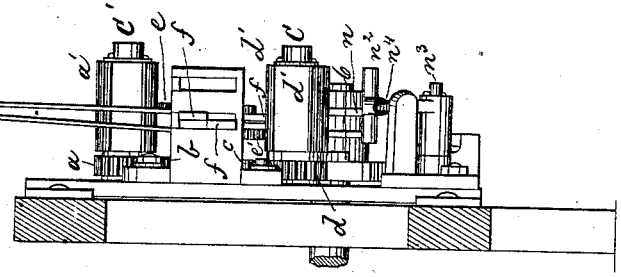
Figure 3:
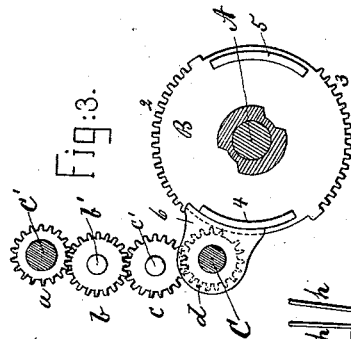
Figure 1:
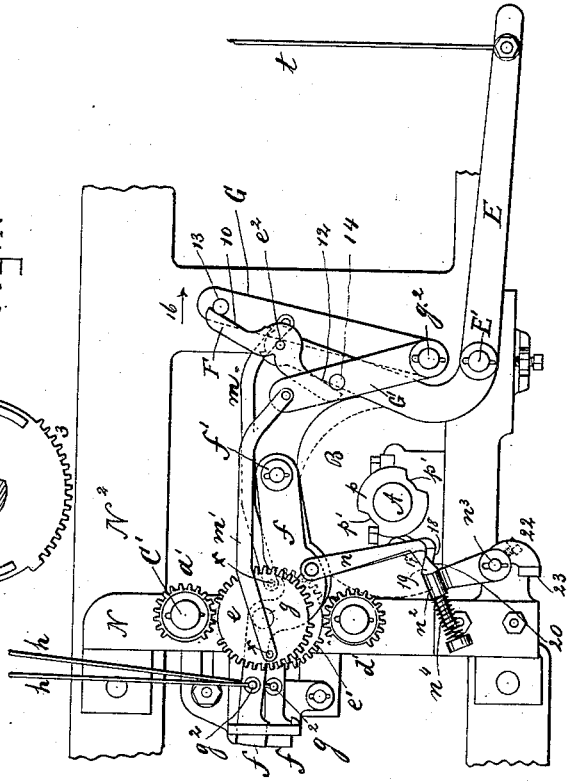

Figure 1 is a side elevation of the mechanism constituting our improved mechanical movement; Fig. 2, a left-hand end elevation of Fig. 1, with the wires or ends partially represented in Fig. 1 extended up to levers moved by a pattern-surface. Fig. 3 is a detail of the gearing for driving the partial gear intermittingly from the main shaft, and Fig. 4 is a diagram representing the four different positions in which the main lever E can be placed.

Let A represent the main or driving shaft of the mechanism to be described, it being driven by power in any usual manner.

The shaft has a gear, B, provided with two series of segmental teeth, 2 3, and two laterally-projecting arc-shaped flanges, 4 5, the latter to be acted upon by the convex-faced block 6, attached to the gear $d$, placed loosely on a stud, C, held on the frame N, forming part of the main frame $N^2$, the said gear $d$ having one tooth removed, in order that the series of teeth 2 and 3 may readily engage and then run out of mesh with it.

The parts B, 2, 3, 4, 5, 6, and $d$ constitute substantially what is called the "Geneva stop-movement," and the object is to move the gear $d$ intermittingly. The gear $d$ engages an intermediate, $c$, and the latter a second intermediate, $b$, both loose, respectively, on studs $c'$ $b'$, and the gear $b$ engages and drives the gear $a$, loose on the stud $C'$.

The gears $a$ $d$ have connected with them, respectively, the partial gears $a'$ $d'$, each made as a long fluted gear having part of its teeth removed and adapted to turn about the studs C' C, respectively, so as to permit the engagement of one or the other of the toothed cranks $e$ $e'$ with first one and then the other of the said partial gears, the latter turning the said toothed cranks for a little more than one hundred and eighty degrees, and the running out of mesh from the said toothed cranks leaving them at rest until the latter is again raised or lowered to engage that one of the partial gears which did not last operate it.

In order to effect the change of position of the toothed cranks $e$ $e'$ to place them in engagement with first one and then the other of the partial gears $a'$ $d'$, and thereby turn the toothed cranks in first one and then in the opposite direction, as usual, the said toothed cranks are mounted on studs $g$ of vibrators $f$, pivoted on a stud or fulcrum, $f'$, attached to part of the framing N, secured to the main framing $N^2$, the said vibrators having pins $g^2$, to which are attached cords, wires, rods, or links $h$, secured at their upper ends to the levers $h'$, acted upon by the pattern surface or chain $h^2$, of any usual construction, and operated in any usual manner.

The wire lever E, having its fulcrum at E', has pivoted upon it at $e^2$ the secondary lever F, having two faces, 10 12, adapted to be acted upon, respectively, by two studs or pins, 13 14, secured, respectively, to the pin or stud carriers G G', (herein shown as radius-bars having a common fulcrum, $g^2$,) the said pins 13 14 coming in contact with the faces 10 12 at opposite sides of the fulcrum $e^2$. These studs or pins and carriers G G' are moved, respectively, by the connecting-rods $m\ m'$, each of which, at its inner end, embraces a crank-pin, $x$, of one of the toothed cranks $e$ or $e'$. If both the crank-pins are moved to their extreme left-hand position, viewing Fig. 1, then both pins or studs 13 14 will be at their farthest left-hand position, and both ends of the secondary lever F will also be in their extreme left-hand position, and the main lever E will have its greatest movement in that direction; but if one of the crank-pins $x$ is in its extreme left-hand position and the other in its extreme right-hand position, as is represented in Fig. 1, that end of the secondary lever which is acted upon by the stud or pin under control of the crank-pin that is farthest to the right will be held in a position also farthest to the right, and the main lever will occupy one of its two intermediate positions, and should both crank-pins $x$ be moved to their extreme right-hand position, then both ends of the secondary lever would be permitted to come into their farthest position to the right, and the main lever will occupy a yet different position. It will thus be seen that the main lever will occupy its extreme or one of its intermediate positions, according to whether or not crank-pins $x$ of the toothed cranks occupy positions at the same side of their fulcra $g$, or at opposite sides thereof, which positions they may be made to occupy at will by causing them to be engaged with one or the other of the partial gears $a'\ d'$.

The lever E, by the weight which it is to move, or the reason of the force it has to overcome, will be normally borne toward the right in Fig. 1, or in the direction of the arrow 16, so that the faces of the secondary lever will always be kept pressed closely against the studs or pins 13 14 of the carriers, the said faces sliding upon the said pin; or it might be on rollers on the said pin.

To hold the toothed cranks in engagement with the partial gears, each vibrator is provided with a latch, $n$, having two faces, 17 18, which engage, respectively, the two inclined faces 19 20 of a holder, $n^2$, pivoted at $n^3$ and acted upon by a spring, $n^4$, the said holder having an arm, 22, to act against a stop, 23, to limit the forward position of the acting head of the said holder.

The latches are held in engagement with the holder by means of a cam, $p$, on the main shaft A; but the said cam has two spaces, $p'$, to permit the latches to be disengaged from the edge of the holder after the toothed cranks come to rest and before the vibrators are again to be distributed or moved.

We do not broadly claim two levers, one pivoted upon the other; nor do we broadly claim a vibrator and a toothed crank independently of its operation with two levers, as above described.

In Fig. 4 the full lines represent the position of the main and secondary levers when both the crank-pins $x$ are at the left of their centers $g$, viewing Fig. 1, the lever then lifting the connected rod $t$ into its highest position. By moving the pin 14 into its position designated by dotted lines and marked 14, No. 2, the pivot $e^2$ of the secondary lever F will assume the position $e^2$, No. 2, and the main lever E will drop one step, or to 42.

Assuming the parts to be as in full lines, Fig. 4, if the pin 13 is moved into its position 13, No. 2, leaving the pin 14, as in dotted lines, at the left of Fig. 4, the secondary lever will assume the position designated by the dotted lines 35, with its pivot at $e^2$, No. 3, and the lever E will occupy a yet lower position on the line 41.

If both pins 13 14 are moved into their positions 13, No. 2, 14, No. 2, then the secondary lever will occupy the position designated by line 36, with its pivot or fulcrum at $e^2$, No. 4, and then the lever E will occupy its lowest position, or in the line 40. It will thus be seen that the lever can be moved into any one of four positions, and by moving the pins 13 14 in the same or in opposite directions separately or simultaneously the lever may be moved from either one of the positions 40, 41, 42, 43 into any one of the said positions.

We claim—

1. The main lever, to be moved different distances, and a secondary lever pivoted thereon, and provided with two faces, 10 12, combined with movable carriers and studs or pins 13 14, to act upon the said faces and turn the secondary lever and fulcrum and move the main lever, substantially as described.

2. The toothed cranks and means to move them, two connecting-rods, and two studs or pins held by carriers, combined with a main lever, and a secondary lever pivoted thereon and acted upon at each side of its fulcrum by studs or pins of the carrier, substantially as described.

3. The yielding holder, combined with the latches and vibrators, and with the cam $p$, to operate substantially as described.

4. The vibrators, their attached toothed cranks and partial gear to move them, and latches $n$, combined with a holder, and with a cam to at times maintain the engagement of the latches and holder and at times permit their disengagement, substantially as described.

In testimony whereof we have signed our names to this specification in the presence of two subscribing witnesses.

GEO. CROMPTON.
HORACE WYMAN.

Witnesses:
J. B. SYME,
J. A. WARE.